United States Patent [19]

Piccinini et al.

[11] 4,093,541

[45] June 6, 1978

[54] METHOD FOR THE REMOVAL OF METALLIC MERCURY

[75] Inventors: Carlo Piccinini, Fano (Pesaro); Vincenzo Conti, S.Ippolito, (Pesaro), both of Italy

[73] Assignee: Tecneco, S.p.A., Fano (Pesaro), Italy

[21] Appl. No.: 728,242

[22] Filed: Sep. 30, 1976

[30] Foreign Application Priority Data

Oct. 3, 1975    Italy .............................. 27957 A/75

[51] Int. Cl.² ........................................... B01D 15/00
[52] U.S. Cl. .................................................. 210/40
[58] Field of Search ............... 75/101 R, 121; 210/40, 210/75

[56] References Cited

U.S. PATENT DOCUMENTS

| | | | |
|---|---|---|---|
| 3,476,552 | 11/1969 | Parks et al. ........................ | 75/101 R |
| 3,873,581 | 3/1975 | Fitzpatrick et al. ............... | 75/121 X |
| 3,897,331 | 7/1975 | Smith et al. ....................... | 210/40 X |

Primary Examiner—Frank A. Spear, Jr.
Assistant Examiner—Richard W. Burks
Attorney, Agent, or Firm—Morgan, Finnegan, Pine, Foley & Lee

[57] ABSTRACT

A method is disclosed for removing metallic mercury from industrial sewage waters, the improvement consisting in that the polluted liquors are treated with activated carbon having a high specific surface.

1 Claim, No Drawings

METHOD FOR THE REMOVAL OF METALLIC MERCURY

This invention relates to a method for the removal of metallic mercury particles from media which contain them, said method resorting to the use of activated carbon having a high specific surface, with which said media are put into contact.

Methods are known which permit the removal of metallic mercury to be effected from media which contain it: the particles having the larger size are mechanically collected, for example by decantation or deposit in specially provided containers. When particles contained in liquid media are involved, the flocculation can be carried out of the hydroxides of metals as contained in, or added to, the liquid in the form of salts, the mercury particles being dragged in the flocculation and subsequently separated with conventional means.

Sometimes, however, metallic mercury is in the form of particles having a particularly small size, which are in any case such as to be unable to decant or deposit within commercially interesting times, or incapable of being occluded by the metallic hydroxide.

This is, sometimes, the case of the purification of industrial sewage waters which contain mercury in the form of organic or inorganic compounds, said purification being carried out by reduction of the mercury compound to metallic mercury, for example by the action of two elements of a different nature as immersed in the solution to be purified under appropriate pH conditions, the elements being electrically connected, either internally or externally to the liquid phase, such as disclosed in the Italian Patent Specification No. 826,615, to SNAMPROGETTI S.p.A.

According to the method disclosed in said Patent, to which reference will be had as regards the origin of the medium which contains metallic mercury according to the method of the present invention, which, anyhow, should not be considered to be limited thereby, it is possible to obtain the quantitative conversion of the mercury compounds, both organic and inorganic, by properly selecting the elements to be used for the reduction (a metal which is less noble than hydrogen, and carbon, or another metal nobler than hydrogen).

The above outlined treatment produces metallic mercury which, in a few cases, can partially be dragged by the effluents: it is normally removed by flocculation, provided that the particles have a size compatible with such a treatment.

The subject-matter of the present invention is a method which permits the removal of metallic mercury from media containing same, irrespective of the particle size and without resorting to preliminary treatments of the media, such as flocculation or coalescence, by merely contacting the medium concerned with high specific surface activated carbon.

The removal of metallic mercury is quantitative and the activated carbon, once it has been saturated, can be recovered by a conventional regeneration run.

The term "activated carbon" is intended herein to connote any form of carbon which is characterized by a high adsorbent power towards gases, vapors and colloidal solids. The carbon, both of vegetable or animal origin, is produced by distillation of carbonaceous materials and is then subjected to appropriate activation processes.

Its activation is carried out by a mere heating at a high temperature (800° C–900° C) which originates a particulated structure.

To the purposes of the present invention, the use of an activated carbon is required, which has an area surface equal to, or greater than, 250 square meters per gram.

The solution coming from the treatment with activated carbon, which solution contains metal salts, such as for example iron salts in the particular case of the Italian Patent aforementioned, can be used as such, and this is an advantage of the method according to the present invention, for subsequent treatments of industrial sewage waters, for example flocculation treatments. As an alternative, if the concentration of the metallic ions is below the required limits, the solution can be discharged as such. Otherwise, when it is not used for particular treatments, the solution must be sent to depolluting treatments so as to reduce the concentration of the metal salts within acceptable ranges.

EXAMPLES 1 - 3

Sewage waters containing metallic mercury, at variable concentrations, have been treated with activated carbons with different surface areas. The concentrations used and the results which have been obtained are reported by the TABLE below.

| Activated carbon having a surface area of 1,200 square meters per gram. ||
| --- | --- |
| Incoming Hg milligrams per liter | Outcome Hg micrograms |
| 3 | less than 2 |
| 4 | less than 2 |
| 4.8 | less than 2 |
| 5.4 | less than 2 |

| Activated carbon having a surface area of 850 square meters per gram. ||
| --- | --- |
| Incoming Hg milligrams per liter | Outcome Hg micrograms |
| 2 | less than 2 |
| 3 | less than 2 |
| 4 | less than 2 |

| Activated carbon having a surface area of 350 square meters per gram. ||
| --- | --- |
| Incoming Hg milligrams per liter | Outcome Hg micrograms |
| 2 | less than 2 |
| 4 | less than 2 |
| 5 | less than 2 |

What we claim is:

1. A method for the removal of metallic mercury from previously untreated industrial sewage waters containing it, comprising the step of contacting said sewage waters with activated carbon having a surface area of at least 350 square meters per gram.

* * * * *